Dec. 10, 1957  A. E. SMITH  2,816,187

INDICATING DEVICE

Filed Feb. 28, 1955

Inventor
Archie E. Smith
Wm O Moeser
Atty.

United States Patent Office 2,816,187
Patented Dec. 10, 1957

2,816,187
INDICATING DEVICE

Archie E. Smith, Springfield, Vt., assignor to Jones and Lamson Machine Company, a corporation of Vermont Application February 28, 1955, Serial No. 490,830

2 Claims. (Cl. 200—61.39)

My invention relates to control devices and relates more particularly to novel means for indicating zero speed of shafts and other rotating members.

In modern machine tools of the automatic type, as described generally in U. S. Patent 2,489,023, issued November 22, 1949, to R. M. Gamble, the sequential operation of the machining cycle is performed automatically. Certain functions, like loading and unloading the work pieces, and the release of the chuck or other work driving device, can be safely performed only when the spindle of the machine tool is at rest. After completion of the machining portion of the complete cycle, the main brake is automatically applied to bring the spindle to rest. At zero speed it is then safe to unclamp the work piece and reload the machine. In present-day practice there is no simple and inexpensive means for positively indicating the point of zero speed. Various indirect means have heretofore been proposed and utilized to accomplish the desired result. For example, a timer may be started at the instant the main brake is applied. Knowing the time required to bring the spindle to a stop, the timer can be set to initiate the next part of the cycle at an appropriate moment after the elapse of a predetermined interval. While this method is workable, it consumes unnecessary time inasmuch as the braking time is never absolutely constant. Over a period of usage, braking time may increase with brake wear. Also as rotating fixtures and work pieces vary in weight from application to application, the time required to bring the rotating mass to a stop with a given braking device will vary. Therefore, for complete safety and reliability the timer must be set for a period well beyond the expected minimum braking time.

Centrifugal switches have also been used in an attempt to solve this problem. They operate at some minimum speed, always above zero, and cannot be used where complete stoppage is a requirement before indication is given for the next function. Furthermore, as centrifugal switches are made more sensitive in order to respond to extremely low angular velocities, they become less capable of operating at high speeds of rotation.

It is therefore a principal object of my invention to provide a novel device capable of indicating the zero speed point of a decelerated rotating member.

It is a further object of my invention to provide a device for achieving the first named object which is simple, rugged, and inexpensive, and which has no inherent limit in the maximum speed at which it can be operated.

These and other objects and advantages of my invention will become readily apparent from the following detailed specification and accompanying drawings, in which.

Figure 1:
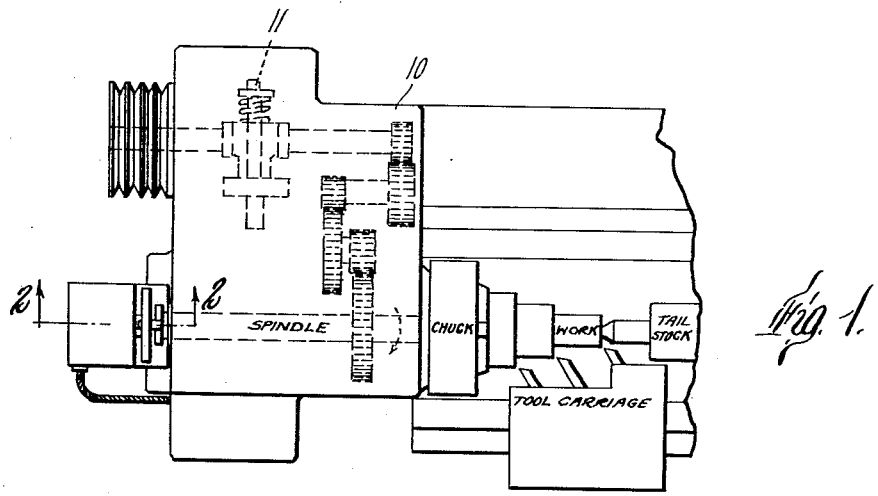
Figure 1 is a plan view of a portion of a machine tool showing one possible setting of the invention.

Referring now more particularly to the drawings, an automatic lathe is shown, largely schematically, in Figure 1, having a headstock 10 in which is mounted a spindle carrying a chuck adapted to drive a work piece, all as shown. After the tools have completed the desired machining operations, a spindle brake 11 is applied automatically as is well known in the art. After the spindle is brought to rest by the brake 11, an indication, preferably electrical, is required to indicate that other functions of an automatic cycle can be safely initiated such as chuck release and unloading of the finished work piece.

Mounted on and rotating with the spindle is a driving member 13 carrying two driving pins 14 and 15. These pins drive a flywheel 16 through two arcuate slots 17 and 18. The flywheel 16 thus rotates with the spindle and carries with it a hysteresis disc 20. Mounted around the disc 20 is a housing 21 mounted for limited rotational movement on bearings 22. The housing 21 carries a series of permanent magnets 23 in proximity to the disc 20. The magnets and disc serve to place a permanent drag or braking effect upon the flywheel 16. This braking effect is so chosen (by the number of magnets or their spacing from the disc 20 or by changing the moment of inertia of flywheel 16) as to be capable of decelerating the flywheel 16 at some slower rate than the decelerating rate of the spindle produced by the brake 11.

Figures 6, 7:
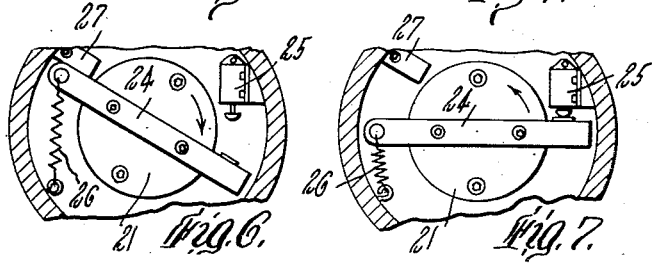
Figure 6 is a view along the lines 6—6 of Figure 2.
Figure 7 is a view similar to that of Figure 6 with the device in the stopped position.

Fixed to the housing 21 is a lever arm 24, Figures 6 and 7. One end of arm 24 is adapted to actuate a switch 25. The arm is biased as by a spring 26 into the switch actuating position shown in Figure 7. The switch 25 may be provided with an overtravel stop which serves also to limit the counter-clockwise movement of the housing 21 (Figure 7) while a stop 27 serves to limit the clockwise movement of the housing 21 (Figure 6).

The operation of my invention will now be described. During the accelerating and normal running period of the machine, the spindle will drive the flywheel 16 through pins 14 and 15, which will be in the position shown in Figure 3, with the spindle and flywheel rotating clockwise. Under these conditions the torque on the housing 21 produced by the drag of the magnets 23 and hysteresis disc 20 will tend to rotate the housing clockwise, as shown in Figure 6. This torque is sufficient to drive the lever 24 against the stop 27, thus opening the switch 25 and storing energy in the spring 26. The device can run indefinitely in this position during the period of acceleration and normal running of the spindle at a machining speed.

Figures 3, 4, 5:
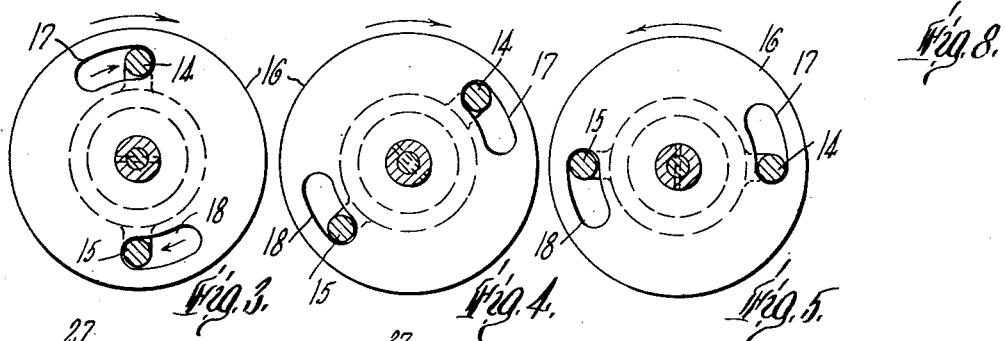
Figures 3, 4 and 5 are diagrams showing the function and various positions of the driving members as seen on the lines 3—3 of Figure 2.

Upon completion of the cutting cycle, the brake 11 is applied and the entire drive including the spindle begins to decelerate. Since this rate of deceleration with the brake 11 fully applied is greater than the deceleration rate, the hysteresis ring 20 is able to apply to the flywheel 16, the flywheel overruns and tends to drive the spindle. Under these conditions the flywheel continues in a clockwise direction, as seen in Figure 4, but the pins 14 and 15 are now at the opposite ends of their respective arcuate slots 17 and 18. The lever 24 remains in the position shown in Figure 6 for the entire deceleration period.

When the spindle comes to a complete stop, the flywheel 16 also stops. At that instant the pins 14 and 15 are still in the position shown in Figure 4, and the lever 24 is in the position shown in Figure 6. The arcuate slots 17 and 18 provide lost motion which permits the flywheel now to rotate counterclockwise to the position shown in Figure 5. The energy for producing this rotation comes from the spring 26; and the housing 21, flywheel 16, and lever 24 all rotate counterclockwise to the position shown in Figure 7. This action of the spring 26 thereby causes actuation of the switch 25. Thus a positive indication that the zero point in the deceleration of the spindle has been reached is provided.

Figures 2, 8:
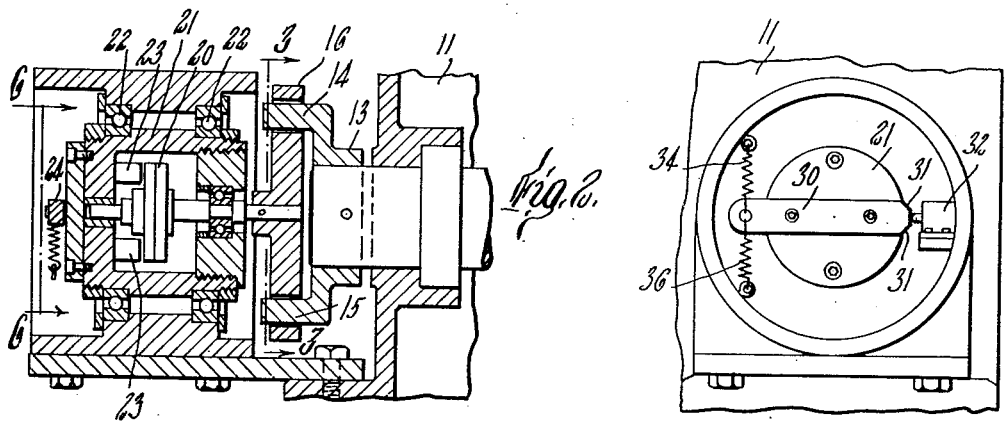
Figure 2 is a sectional view along the lines 2—2 of Figure 1.
Figure 8 illustrates a modification of the invention for two way operation as will hereinafter appear.

My invention as heretofore described is used in unidirectional devices. The modification shown in Figure 8 permits zero indication of a member which may be rotated in either direction. The action with respect to the driving pins and flywheel is exactly the same as described above. However, a lever 30 is provided with cam surfaces 31 adapted to actuate a switch 32 from either direction. The lever 30, and therefore the housing 21 to which it is affixed, is spring centered by springs 34 and 36. In clockwise operation, spring 34 is compressed and spring 36 is in tension. The opposite obtains for counter-clockwise operation. In either case, at the point of zero speed of the spindle, and only at that point, the flywheel 16 reverses direction (within the limits of the arcuate slots 17 and 18) under the influence of the springs 34 and 36, the lever 30 returns to its spring centered position, and the switch 32 is again actuated.

While I have shown a hysteresis brake to produce the desired action described above, any means producing a constant and effective drag between housing 21 and flywheel 16 is acceptable and comprehended within the scope of my invention. It is only essential that the drag of this device be capable of producing a deceleration of the flywheel 16 at a rate which is less than the rate of deceleration produced by the spindle brake on the total of the rotating masses in the headstock.

The indication produced by actuation of switch 25 or 32 may be employed as desired to control subsequent functions in the complete machine cycle.

It will be seen that my device may be mounted on the end of the spindle, as shown, or in any other position in the gear train of the spindle drive or in the tail center, if a live center is employed. It is only necessary that spindle rotation and rotation of the flywheel 16 occur together. In another modification the stop 27 may be in the form of a switch similar to the switch 25, best shown in Figures 6 and 7. In such case, when the spindle has reached normal running speed, the switch at 27 is actuated. This provides an indication that the work spindle is revolving at the desired speed and the movement of the tool carriage may be safely initiated.

If over a period of time the spindle brake 11 becomes worn, or for any other reason fails to operate in an efficient manner, the deceleration rate of the spindle will no longer exceed the deceleration rate of the flywheel 16. Therefore, at zero speed, no indication will be provided for initiating the next step in the overall machine cycle. This is not only "fail safe" but indicates immediately to the operator that brake adjustment or repair is required. Thus my device also provides a convenient indication of brake failure or inefficiency.

While I have described herein a preferred embodiment of my invention for purposes of illustration, it will be appreciated that variations and modifications within the spirit and scope of the appended claims may readily occur to persons skilled in the art.

I claim:

1. A device for indicating when a rotating member has come to rest comprising, a first rotatable inertial element, a lost motion coupling between said member and said first element providing driving and driven positions of said first element relative to said member, a second rotatable element having a yieldable coupling to said first element, biasing means on said second element operating through said yieldable coupling to hold said first element in a driven position with respect to said member, and signal means on said second element operable when said first element moves through said lost motion from a driving to a driven position relative to said member.

2. A device for indicating when a rotating member has come to rest comprising, a first rotatable inertial element, a lost motion coupling between said member and said first element providing driving and driven positions of said first element relative to said member, a second rotatable element having a yieldable coupling to said first element, spring means on said second element operating through said yieldable coupling to bias said first element into a driven position with respect to said member, and signal means on said second element operable when said first element moves through said lost motion from a driving to a driven position relative to said member.

References Cited in the file of this patent

UNITED STATES PATENTS

| | | |
|---|---|---|
| 2,116,842 | Metcalf | May 10, 1938 |
| 2,141,278 | Owens | Dec. 27, 1938 |
| 2,294,605 | Newell | Sept. 1, 1942 |
| 2,294,606 | Newell | Sept. 1, 1942 |
| 2,381,225 | Newell | Aug. 7, 1946 |
| 2,412,513 | Jones et al. | Dec. 10, 1946 |
| 2,475,169 | Zahn | July 5, 1949 |
| 2,488,629 | Kline | Nov. 22, 1949 |
| 2,640,899 | Dickey | June 2, 1953 |
| 2,648,746 | Dickey | Aug. 11, 1953 |
| 2,718,567 | Elliot et al. | Sept. 20, 1955 |
| 2,731,630 | Karlson | Jan. 17, 1956 |
| 2,747,699 | Lucien | May 29, 1956 |

FOREIGN PATENTS

| | | |
|---|---|---|
| 624,949 | Great Britain | June 20, 1949 |